US008884161B1

(12) United States Patent
Gretz

(10) Patent No.: US 8,884,161 B1
(45) Date of Patent: Nov. 11, 2014

(54) NON-METALLIC ELECTRICAL FLOOR BOX

(71) Applicant: Thomas J. Gretz, Port St. Lucie, FL (US)

(72) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 125 days.

(21) Appl. No.: 13/853,726

(22) Filed: Mar. 29, 2013

Related U.S. Application Data

(60) Provisional application No. 61/702,495, filed on Sep. 18, 2012.

(51) Int. Cl.
*H02G 3/08* (2006.01)
*H02G 3/18* (2006.01)
*H01H 9/02* (2006.01)

(52) U.S. Cl.
CPC ............... *H02G 3/185* (2013.01); *H02G 3/08* (2013.01); *H02G 3/081* (2013.01); *H01H 9/02* (2013.01)
USPC ............... 174/50; 174/482; 174/490; 174/53; 220/3.2; 220/3.3

(58) Field of Classification Search
CPC ......... H02G 3/08; H02G 3/081; H02G 3/088; H02G 3/10; H02G 3/12; H02G 3/185; H01H 9/02; H01H 9/04; H05K 5/00; H05K 5/0004; H05K 5/0008; H05K 5/02; H05K 5/0217; H05K 5/03
USPC ......... 174/480, 481, 482, 483, 485, 484, 486, 174/487, 490, 488, 50, 53, 58, 66, 67; 220/3.2–3.9, 4.02, 241, 242; 439/535, 439/536; 248/906
See application file for complete search history.

(56) References Cited

U.S. PATENT DOCUMENTS

| | | | |
|---|---|---|---|
| 5,285,009 A | 2/1994 | Bowman et al. | |
| 5,350,884 A | 9/1994 | Littrell | |
| 5,783,774 A * | 7/1998 | Bowman et al. | 174/482 |
| 5,796,037 A | 8/1998 | Young et al. | |
| 6,179,634 B1 * | 1/2001 | Hull et al. | 174/485 |
| 6,790,084 B1 * | 9/2004 | Osborn et al. | 174/485 |
| 6,878,877 B1 * | 4/2005 | Cozzi et al. | 174/53 |
| 7,388,164 B2 * | 6/2008 | Scanzillo | 174/482 |
| 7,511,231 B2 | 3/2009 | Drane | |
| 7,799,993 B2 * | 9/2010 | Drane et al. | 174/67 |
| 8,242,365 B2 * | 8/2012 | Galasso et al. | 174/483 |
| 8,273,998 B2 | 9/2012 | Drane | |
| 8,759,676 B1 * | 6/2014 | Gretz | 174/50 |

* cited by examiner

*Primary Examiner* — Angel R Estrada

(57) ABSTRACT

An electrical outlet box for installing in a hole defined in a pre-existing, finished floor of a building. The outlet box comprises a box portion, a backplate, and a cover plate. The box portion comprises a first pair of opposing walls, a second pair of opposing walls, a bottom wall, and a mounting flange. Top edges of each wall of the first and second pairs of opposing walls define an open top end of the box portion. The bottom wall is affixed to bottom edges of each wall of the first and second pairs of opposing walls, thereby defining a cavity within the first and second pairs of opposing walls and the bottom wall. The cavity is adapted for receiving an electrical outlet. The mounting flange surrounds the open top end and is adapted for sitting flush against the installed floor when the outlet box is mounted in the hole.

20 Claims, 6 Drawing Sheets

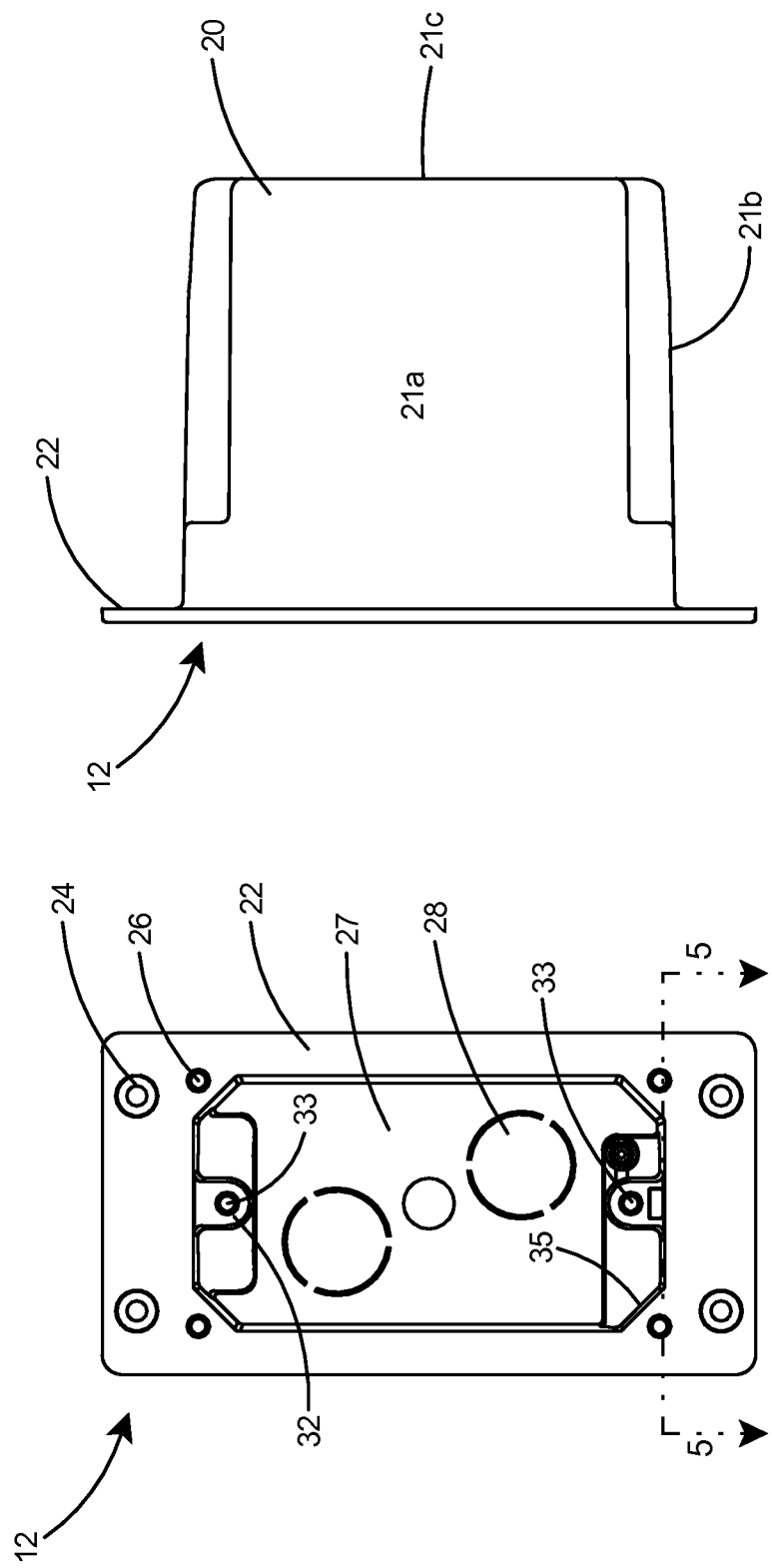

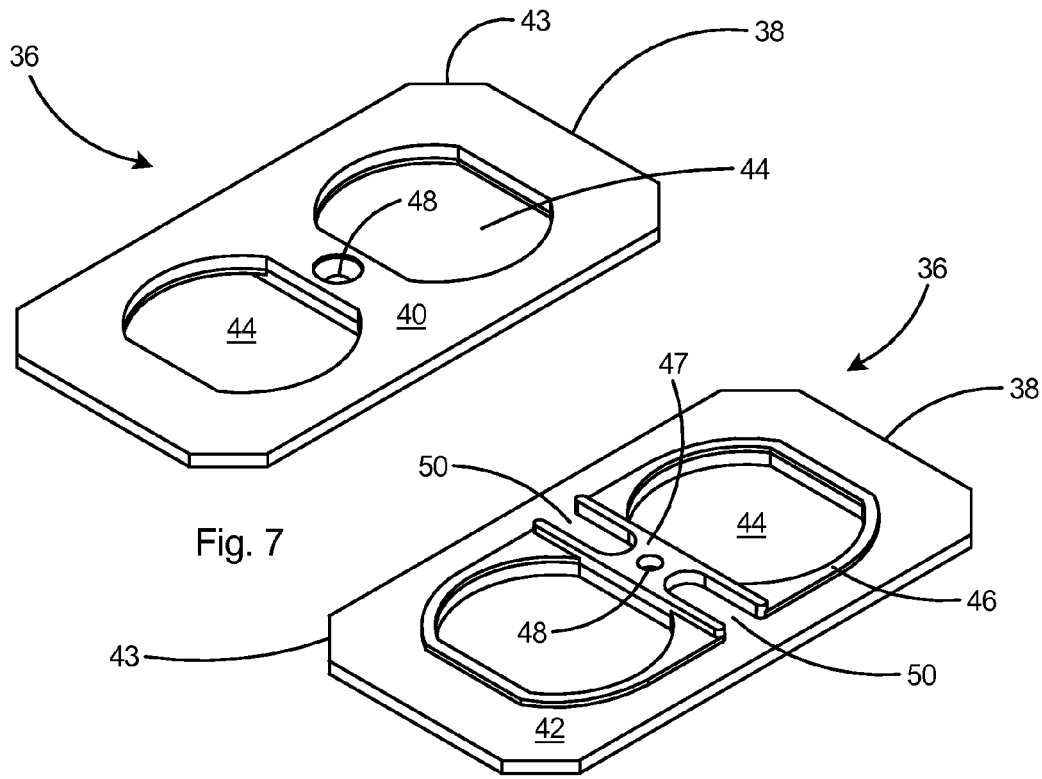
Fig. 7
Fig. 8
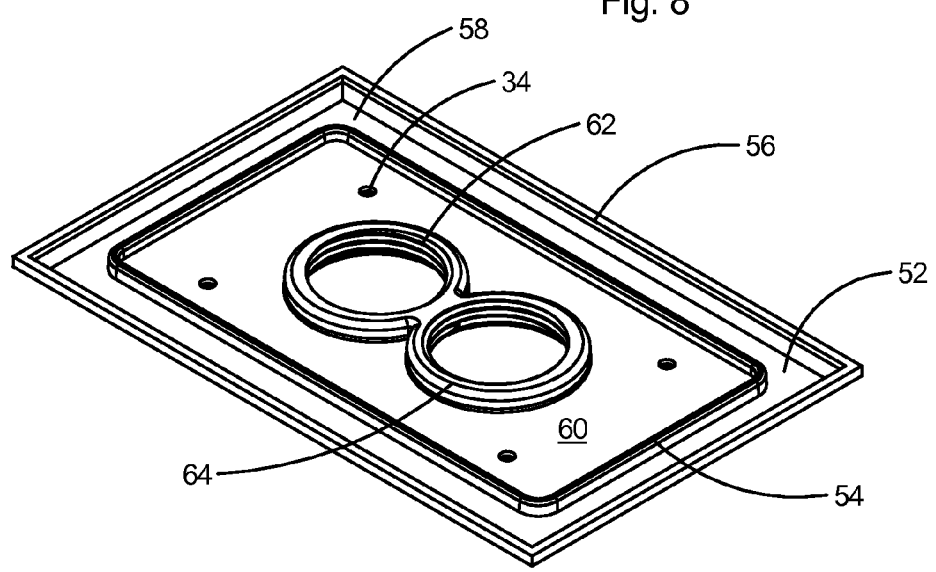
Fig. 9

NON-METALLIC ELECTRICAL FLOOR BOX

CROSS-REFERENCE TO RELATED APPLICATIONS

This application claims priority to provisional U.S. Application No. 61/702,495, filed Sep. 18, 2012, the contents of which are incorporated herein by reference in their entirety.

FIELD OF THE INVENTION

The present invention generally relates to electrical outlet boxes, and specifically to electrical outlet boxes for installing in floors.

BRIEF SUMMARY OF THE INVENTION

In one embodiment of the invention, an electrical outlet box is provided for installing in a hole defined in an installed floor of a building. The outlet box comprises a box portion, a backplate, and a cover plate. The box portion comprises a first pair of opposing walls, a second pair of opposing walls, a bottom wall, and a mounting flange. Top edges of each wall of the first and second pairs of opposing walls define an open top end of the box portion. The bottom wall is affixed to bottom edges of each wall of the first and second pairs of opposing walls, thereby defining a cavity within the first and second pairs of opposing walls and the bottom wall. The cavity is adapted for receiving an electrical outlet. The mounting flange surrounds the open top end and is adapted for sitting flush against the installed floor when the outlet box is mounted in the hole. The backplate has two receptacle plug face holes defined therein and has a size and shape corresponding to an inner perimeter of the open top end such that the backplate sits within the open top end. The backplate is adapted to sit on the electrical outlet within the cavity. The receptacle plug face holes are adapted to receive respective ones of two plug faces of the electrical outlet. The cover plate has two electrical plug holes defined therein. Each electrical plug hole is aligned with a corresponding receptacle plug face hole of the backplate. The cover plate is adapted to mount to the box portion. The cover plate is sized to close off the open top end and cover the mounting flange when the cover plate is mounted to the box portion.

The box portion may further comprise first and second shelves within the cavity and at opposing ends of the cavity. The first and second shelves each have a top surface that is positioned below the mounting flange and have a mounting hole defined in each top surface. The first and second shelves are adapted to have a corresponding one of a receptacle mounting flange of the electrical outlet sit flush thereon.

One or more cover plate attachment holes may be defined within the mounting flange of the box portion in such a position that cover plate attachment holes are within a perimeter of the hole defined in the floor.

One or more channels may be defined in a bottom surface of the cover plate. The one or more channels are sized and positioned to receive the mounting flange when the cover plate is mounted to the box portion.

In an alternative embodiment of the invention, the outlet box comprises a box portion, a backplate, and a cover plate. The box portion comprises a first pair of opposing walls, a second pair of opposing walls, a bottom wall, a mounting flange, and first and second shelves. Top edges of each wall of the first and second pairs of opposing walls define an open top end of the box portion. The bottom wall is affixed to bottom edges of each wall of the first and second pairs of opposing walls, thereby defining a cavity within the first and second pairs of opposing walls and the bottom wall. The cavity is adapted for receiving an electrical outlet. The mounting flange surrounds the open top end and is adapted for sitting flush against the installed floor when the outlet box is mounted in the hole. The first and second shelves are within the cavity and at opposing ends of the cavity. The first and second shelves each have a top surface that is positioned below the mounting flange and have a mounting hole defined in each top surface. The first and second shelves are adapted to have a corresponding one of a receptacle mounting flange of the electrical outlet sit flush thereon. The backplate has two receptacle plug face holes defined therein and has a size and shape corresponding to an inner perimeter of the open top end such that the backplate sits within the open top end. The backplate is adapted to sit on the electrical outlet within the cavity. The receptacle plug face holes are adapted to receive respective ones of two plug faces of the electrical outlet. The cover plate has two electrical plug holes defined therein. Each electrical plug hole is aligned with a corresponding receptacle plug face hole of the backplate. The cover plate is adapted to mount to the box portion. The cover plate is sized to close off the open top end and cover the mounting flange when the cover plate is mounted to the box portion.

In an alternative embodiment of the invention, the outlet box comprises a box portion, a backplate, and a cover plate. The box portion comprises a first pair of opposing walls, a second pair of opposing walls, a bottom wall, and a mounting flange. Top edges of each wall of the first and second pairs of opposing walls define an open top end of the box portion. The bottom wall is affixed to bottom edges of each wall of the first and second pairs of opposing walls, thereby defining a cavity within the first and second pairs of opposing walls and the bottom wall. The cavity is adapted for receiving an electrical outlet. The mounting flange surrounds the open top end and is adapted for sitting flush against the installed floor when the outlet box is mounted in the hole. One or more cover plate attachment holes are defined within the mounting flange in such a position that cover plate attachment holes are within a perimeter of the hole defined in the floor. The backplate has two receptacle plug face holes defined therein and has a size and shape corresponding to an inner perimeter of the open top end such that the backplate sits within the open top end. The backplate is adapted to sit on the electrical outlet within the cavity. The receptacle plug face holes are adapted to receive respective ones of two plug faces of the electrical outlet. The cover plate has two electrical plug holes defined therein. Each electrical plug hole is aligned with a corresponding receptacle plug face hole of the backplate. The cover plate is adapted to mount to the box portion. The cover plate is sized to close off the open top end and cover the mounting flange when the cover plate is mounted to the box portion.

BRIEF DESCRIPTION OF THE SEVERAL VIEWS OF THE DRAWING(S)

Reference is made herein to the accompanying drawings, which are not necessarily drawn to scale, and wherein:

FIG. 2 is a top view of the box portion of the non-metallic floor electrical box of FIG. 1.

FIG. 3 is a side view of the box portion of the non-metallic floor electrical box of FIG. 1.

FIG. 7 is a top isometric view of a backplate portion that forms a portion of the non-metallic floor electrical box of FIG. 1.

FIG. 8 is a bottom isometric view of the backplate.

FIG. 9 is a bottom isometric view of the cover plate portion of the non-metallic floor electrical box of FIG. 1.

DETAILED DESCRIPTION

Embodiments of the invention comprise a non-metallic floor electrical box. Such a non-metallic floor electrical box enables an electrical receptacle to be easily and neatly installed in a pre-existing, finished floor.

Figure 1:
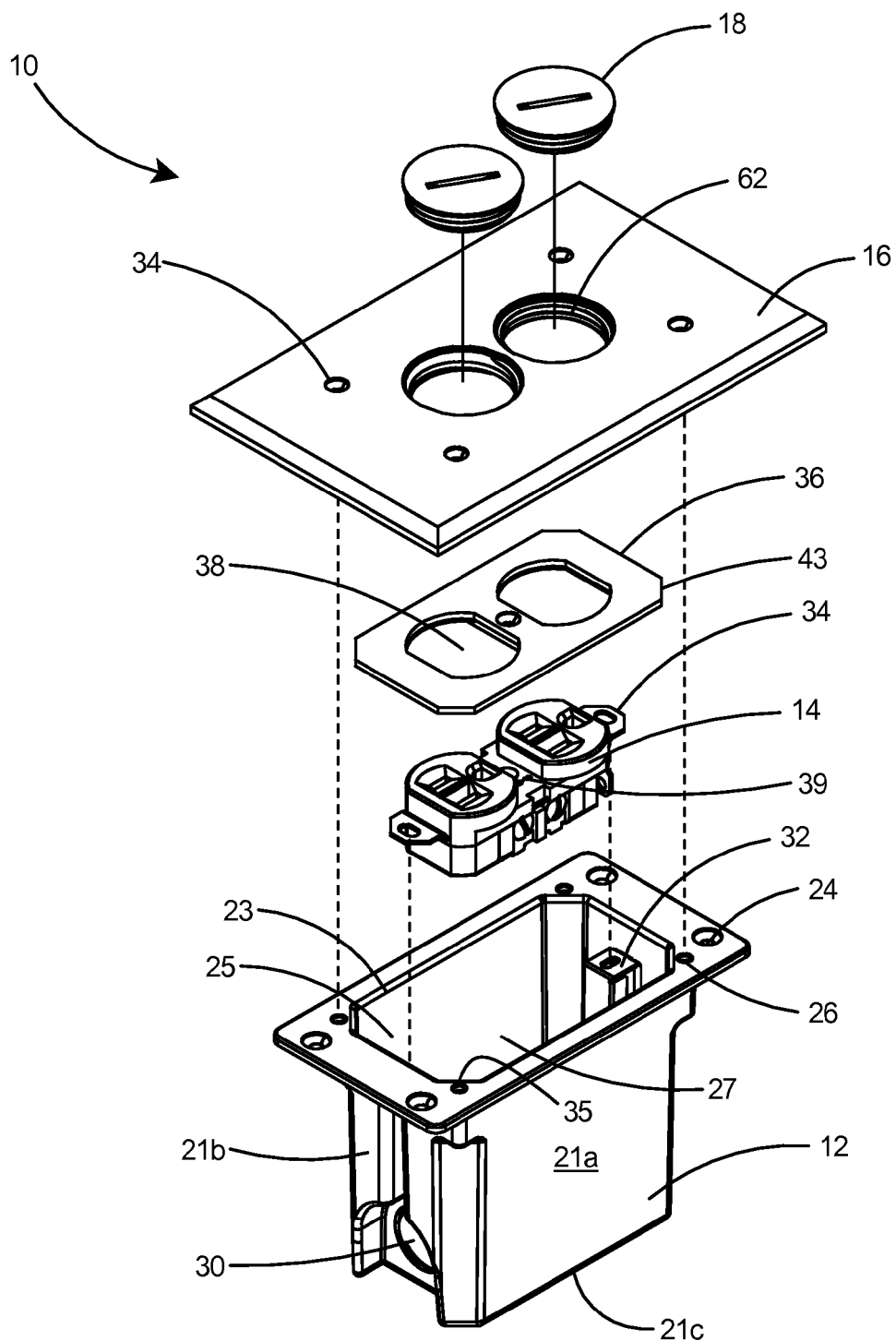
FIG. 1 is an exploded isometric view of a non-metallic floor electrical box, in accordance with embodiments of the invention.
Figure 4:
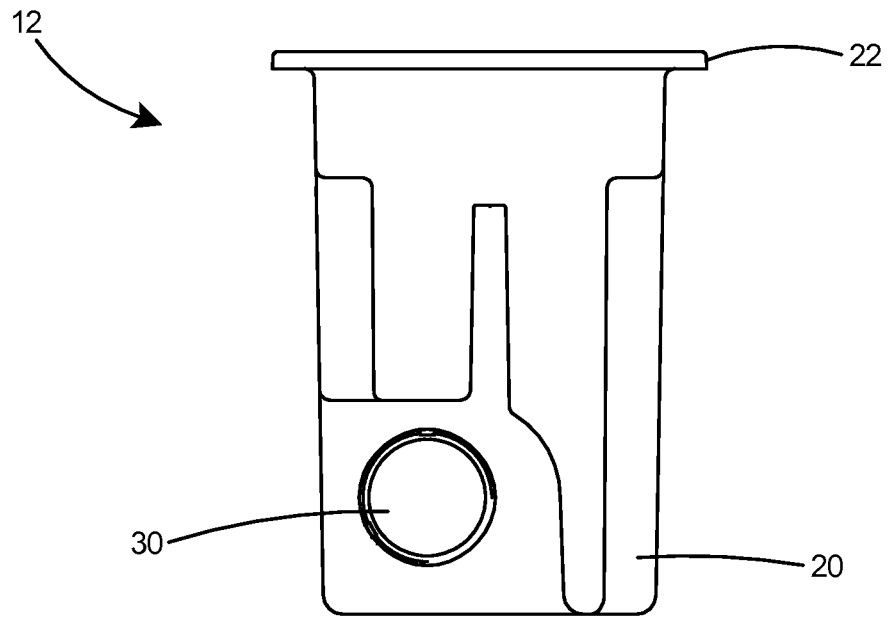
FIG. 4 is an end view of the box portion of the non-metallic floor electrical box of FIG. 1.
Figure 5:
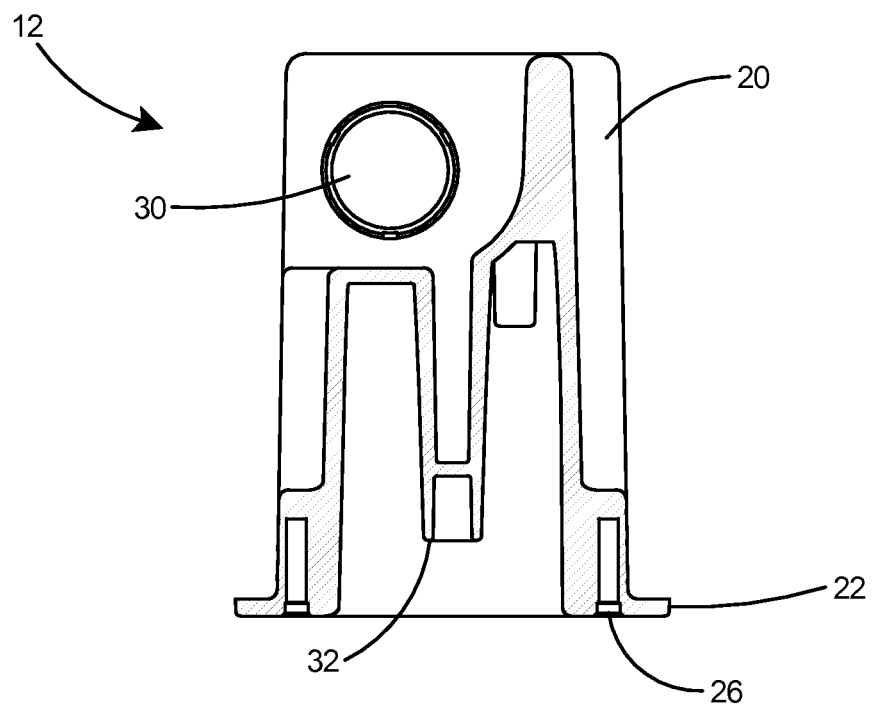
FIG. 5 is a sectional view of the box portion of the non-metallic floor electrical box taken along line 5-5 of FIG. 2.
Figure 6:
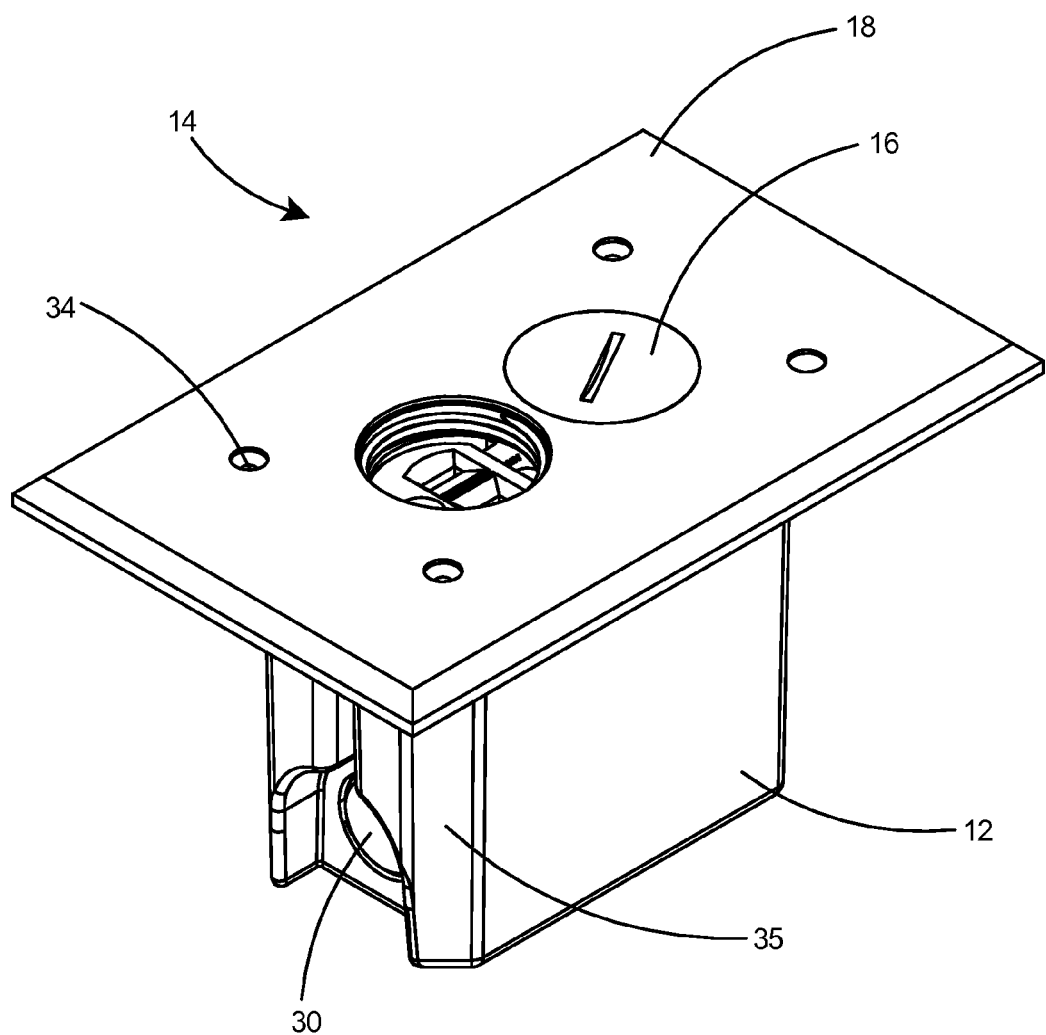
FIG. 6 is an isometric side view of the assembled non-metallic floor electrical box of FIG. 1.

In one embodiment of the invention, illustrated in FIGS. 1 and 6, non-metallic floor electrical box 10 of embodiments of the invention comprises box portion 12, standard duplex electrical receptacle 14, and cover plate 16.

Box portion 12 comprises a rigid, hollow, five-sided box 20 and mounting flange 22 surrounding the open top end of box 20. The five-sided box portion 20 includes a first pair of opposing walls 21a, a second pair of opposing walls 21b, a bottom wall 21c. Top edges 23 of each wall of the first pair of opposing walls 21a and second pair of opposing walls 21b of opposing walls define an open top end 25 of the box portion. In use, an installer cuts a hole into the floor at a desired position to mount non-metallic floor electrical box 10. The hole is sized such that box 20 fits snugly within the hole. When box 20 is placed into the hole, mounting flange 22 sits flush on the surface of the floor. Box portion 12 may be constructed using any suitable strong, durable, rigid non-metallic material, including many different types of plastics.

Box portion 12 is illustrated in more detail in FIGS. 2-5. Mounting flange 22 defines two different sets of holes, each set comprising four holes. Mounting holes 24 are defined within mounting flange 22 in such a position that mounting holes are positioned over the floor when box portion 12 is placed into the hole in the floor. In this regard, screws may be inserted into each of mounting holes 24 (which are not threaded) and screwed into the floor, thereby securing mounting flange 22 (and thereby all of box portion 12) to the floor. Cover plate attachment holes 26 are also defined in mounting flange 22. Cover plate attachment holes 26 correspond positionally with mounting holes 34 that are defined in cover plate 16 (discussed in more detail below). The bottom wall 21c is affixed to bottom edges of each wall 21a and 21b of the first and second pairs of opposing walls and thereby defining a cavity 27 within the first and second pairs of opposing walls and the bottom wall, the cavity adapted for receiving an electrical outlet. As shown in FIG. 2, box portion 12 includes truncated corners 35.

Box portion 12 further comprises a plurality of "knockouts" in one or more sides and/or the bottom. A knock-out is a partially formed hole that enables a portion of the box to be easily removed, thereby creating a hole for wires or cable to enter/exit the box. In the illustrated embodiment, two sides each comprise one knock-out 30 and the bottom comprises two knock-outs 28.

Box portion 12 further comprises two shelves 32, one at each end of the interior of box 20. Each shelf defines a threaded hole 33 in the top of the shelf. The top of each shelf is situated below the level of mounting flange, such that receptacle 14 sits at the desired height relative to cover plate 16 when installed. Receptacle 14 is positioned within box portion 20 such that each receptacle mounting flange 34 sits on top of one of shelf 32. Receptacle 14 is affixed to box 20 using screws that are inserted into the holes defined in receptacle mounting flange 34 and screwed into the threaded holes 33 defined in each shelf 32.

After receptacle 14 is affixed to box 20, a rigid, backplate 36 is positioned on top of receptacle 14. As shown in FIGS. 7 and 8, the backplate 36 includes a flat plate 38 having a top side 40, a bottom side 42, and two openings 44 therein. The backplate 36 includes truncated corners 43 to enable the backplate to seat within the walls of the box portion when the two are assembled together. The top side 40 of the backplate 36 has a flat surface. As shown in FIG. 8, bottom side 42 of backplate 36 includes a raised periphery 46 around the openings 44 and a center raised portion 47. An aperture 48 is provided in the center raised portion 47 of the plate 38. Two opposing notches 50 are provided in the center raised portion 47 surrounding the aperture 48.

Figure 10:
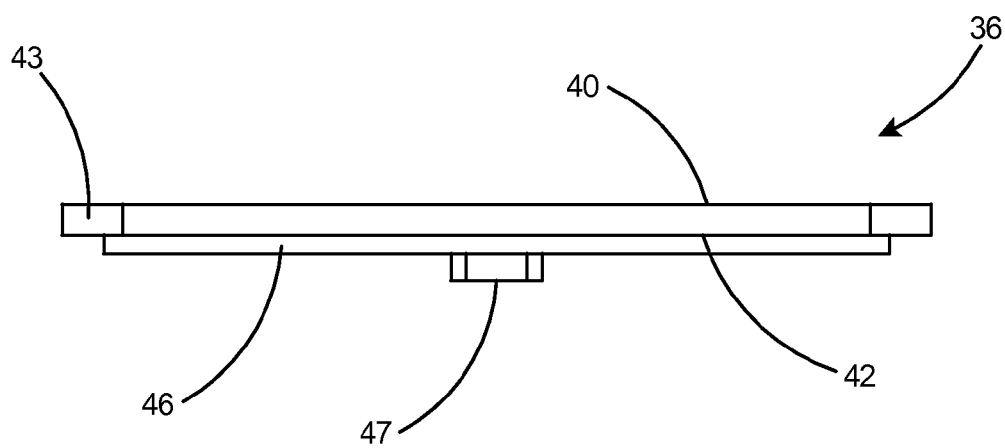
FIG. 10 is a side view of the backplate.

Referring to FIG. 1, the two openings 44 of the backplate 36 correspond to and receive the two plug faces of receptacle 14. The backplate 36, having truncated corners 43, has a perimeter shape that conforms to the inner shape of box 20 having truncated corners 35, such that the backplate sits relatively snugly within box 20, whereby the snug fit of backplate 36 within box portion 12 helps prevent dust or other debris from infiltrating box portion 12 of the non-metallic electrical floor box assembly 10. Center raised portion 47 (see FIGS. 8 and 10) of backplate 36 is adapted to engage the central body portion 49 of the duplex electrical receptacle 14 and level the backplate with respect to the duplex electrical receptacle 14 when backplate 36 is inserted into the box portion 12. The relatively snug fit of the backplate within box 20 coupled with the receiving of the two plug faces in the holes defined in the backplate cause the backplate to ensure that receptacle 14 is positioned such that the two plug faces align with the two holes defined in cover plate 16 when cover plate 16 is affixed to box portion 12. The aperture 48 (see FIG. 8) defined in the center of the backplate, enables the backplate to be affixed to receptacle 14 via a screw inserted into the hole defined in the center of the backplate and screwed into the threaded hole defined in the center of receptacle 14.

After the backplate is installed, cover plate 16 is installed. Cover plate 16 is sized large enough to completely cover mounting flange 22. The underside of cover plate 16 comprises one or more channels or recesses for receiving mounting flange 22, thereby enabling cover plate 16 to sit flush with the floor when affixed to box portion 12. A gasket may be placed within the one or more channels or recesses to provide a secure seal against mounting flange 22, thereby helping prevent dust or other debris from infiltrating box portion 12. Cover plate 16 defines mounting holes 34 that correspond positionally with cover plate attachment holes 26. Cover plate 16 is affixed to box portion 12 using screws that are inserted into mounting holes 34 and screwed into cover plate threaded attachment holes 26, thereby securing cover plate 16 to box portion 12. Cover plate attachment holes 26 are defined within mounting flange 22 in such a position that cover plate attachment holes 26 are within the perimeter of the hole cut in the floor. Such positioning allows the mounting screws to be inserted as far as necessary into cover plate attachment holes 26 to tightly affix cover plate 16 to box portion 12 without the mounting screws being obstructed by the floor.

With reference to FIG. 9, cover plate 16 includes two electrical plug holes 51 and a bottom surface 52 with an inner peripheral wall 54 and an outer perimeter wall 56. Channel 58 extends between the inner peripheral wall 54 and the outer perimeter wall 56. Cover plate 16 includes a substantially flat rear surface 60 within inner peripheral wall 54. Cover plate 16 further includes a raised perimeter 64 around each of the plug holes 51 and a threaded wall 62 on the interior of the raised perimeter 64. Raised perimeter 64 provides increased thickness of the cover plate around the plug holes 51 in order to increase the plate thickness for better forming of threads within the openings.

As shown in FIG. 1, threaded walls 62 in cover plate 16 are each adapted to receive a corresponding exteriorly threaded cap or blank 18. Caps 18 may be affixed to cover plate 16 when receptacle 14 is not in use, thereby helping prevent dust or other debris from infiltrating box portion 12.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An electrical outlet box for installing in a hole defined in an installed floor of a building, the outlet box comprising:
   (a) a box portion comprising:
      a first pair of opposing walls;
      a second pair of opposing walls, top edges of each wall of the first and second pairs of opposing walls defining an open top end of the box portion;
      a bottom wall affixed to bottom edges of each wall of the first and second pairs of opposing walls and thereby defining a cavity within the first and second pairs of opposing walls and the bottom wall, the cavity adapted for receiving an electrical outlet; and
      a mounting flange surrounding the open top end and adapted for sitting flush against the installed floor when the outlet box is mounted in the hole;
   (b) a backplate having two receptacle plug face holes defined therein and having a size and shape corresponding to an inner perimeter of the open top end such that the backplate sits within the open top end, the backplate being adapted to sit on the electrical outlet within the cavity, the receptacle plug face holes being adapted to receive respective ones of two plug faces of the electrical outlet; and
   (c) a cover plate having two electrical plug holes defined therein, each electrical plug hole aligned with a corresponding receptacle plug face hole of the backplate, the cover plate being adapted to mount to the box portion, the cover plate being sized to close off the open top end and cover the mounting flange when the cover plate is mounted to the box portion.

2. The electrical outlet box of claim 1, wherein the box portion further comprises first and second shelves within the cavity and at opposing ends of the cavity, the first and second shelves each having a top surface that is positioned below the mounting flange and having a mounting hole defined in each top surface, the first and second shelves being adapted to have a corresponding one of a receptacle mounting flange of the electrical outlet sit flush thereon.

3. The electrical outlet box of claim 1, wherein one or more cover plate attachment holes are defined within the mounting flange in such a position that cover plate attachment holes are within a perimeter of the hole defined in the floor.

4. The electrical outlet box of claim 1, wherein one or more channels are defined in a bottom surface of the cover plate, the one or more channels being sized and positioned to receive the mounting flange when the cover plate is mounted to the box portion.

5. The electrical outlet box of claim 1, wherein said backplate includes
   a top side and a bottom side; and
   a raised periphery extending around said receptacle plug face holes in said backplate.

6. The electrical outlet box of claim 5 including an aperture in said raised periphery of said backplate.

7. The electrical outlet box of claim 6 wherein said backplate includes two opposing notches in said raised periphery surrounding said aperture.

8. The electrical outlet box of claim 5, wherein said top side of said backplate includes a flat surface.

9. The electrical outlet box of claim 1, wherein said cover plate includes a substantially flat rear surface.

10. The electrical outlet box of claim 9, wherein said flat rear surface of said cover plate includes
    an outer perimeter wall extending therefrom;
    an inner perimeter wall extending therefrom; and
    a channel extending between said outer perimeter wall and said inner perimeter wall.

11. The electrical outlet box of claim 10, wherein said cover plate includes
    two electrical plug holes therein; and
    a raised perimeter around each of said electrical plug holes.

12. The electrical outlet box of claim 11, wherein said cover plate includes a threaded wall on the interior of said raised perimeter.

13. The electrical outlet box of claim 12, wherein
    said electrical outlet box includes one or more exteriorly threaded caps for closing off said plug holes; and
    said threaded walls in said cover plate are each adapted to receive one of said threaded caps.

14. The electrical outlet box of claim 1, wherein
    said opposing walls of said box portion form an inner perimeter having truncated corners;
    said backplate includes an outer perimeter having truncated corners; and
    said backplate forms a substantially snug fit within said opposing walls of said box portion.

15. An electrical outlet box for installing in a hole defined in an installed floor of a building, the outlet box comprising:
    (a) a box portion comprising:
       a first pair of opposing walls;
       a second pair of opposing walls, top edges of each wall of the first and second pairs of opposing walls defining an open top end of the box portion;

a bottom wall affixed to bottom edges of each wall of the first and second pairs of opposing walls and thereby defining a cavity within the first and second pairs of opposing walls and the bottom wall, the cavity adapted for receiving an electrical outlet;

a mounting flange surrounding the open top end and adapted for sitting flush against the installed floor when the outlet box is mounted in the hole; and first and second shelves within the cavity and at opposing ends of the cavity, the first and second shelves each having a top surface that is positioned below the mounting flange and having a mounting hole defined in each top surface, the first and second shelves being adapted to have a corresponding one of a receptacle mounting flange of the electrical outlet sit flush thereon;

(b) a backplate having two receptacle plug face holes defined therein and having a size and shape corresponding to an inner perimeter of the open top end such that the backplate sits within the open top end, the backplate being adapted to sit on the electrical outlet within the cavity, the receptacle plug face holes being adapted to receive respective ones of two plug faces of the electrical outlet; and (c) a cover plate having two electrical plug holes defined therein, each electrical plug hole aligned with a corresponding receptacle plug face hole of the backplate, the cover plate being adapted to mount to the box portion, the cover plate being sized to close off the open top end and cover the mounting flange when the cover plate is mounted to the box portion.

16. The electrical outlet box of claim 15, wherein one or more cover plate attachment holes are defined within the mounting flange in such a position that cover plate attachment holes are within a perimeter of the hole defined in the floor.

17. The electrical outlet box of claim 15, wherein one or more channels are defined in a bottom surface of the cover plate, the one or more channels being sized and positioned to receive the mounting flange when the cover plate is mounted to the box portion.

18. An electrical outlet box for installing in a hole defined in an installed floor of a building, the outlet box comprising:
(a) a box portion comprising:
a first pair of opposing walls;
a second pair of opposing walls, top edges of each wall of the first and second pairs of opposing walls defining an open top end of the box portion;

a bottom wall affixed to bottom edges of each wall of the first and second pairs of opposing walls and thereby defining a cavity within the first and second pairs of opposing walls and the bottom wall, the cavity adapted for receiving an electrical outlet; and a mounting flange surrounding the open top end and adapted for sitting flush against the installed floor when the outlet box is mounted in the hole, one or more cover plate attachment holes being defined within the mounting flange in such a position that cover plate attachment holes are within a perimeter of the hole defined in the floor;

(b) a backplate having two receptacle plug face holes defined therein and having a size and shape corresponding to an inner perimeter of the open top end such that the backplate sits within the open top end, the backplate being adapted to sit on the electrical outlet within the cavity, the receptacle plug face holes being adapted to receive respective ones of two plug faces of the electrical outlet; and (c) a cover plate having two electrical plug holes defined therein, each electrical plug hole aligned with a corresponding receptacle plug face hole of the backplate, the cover plate being adapted to mount to the box portion, the cover plate being sized to close off the open top end and cover the mounting flange when the cover plate is mounted to the box portion.

19. The electrical outlet box of claim 18, wherein the box portion further comprises first and second shelves within the cavity and at opposing ends of the cavity, the first and second shelves each having a top surface that is positioned below the mounting flange and having a mounting hole defined in each top surface, the first and second shelves being adapted to have a corresponding one of a receptacle mounting flange of the electrical outlet sit flush thereon.

20. The electrical outlet box of claim 18, wherein one or more channels are defined in a bottom surface of the cover plate, the one or more channels being sized and positioned to receive the mounting flange when the cover plate is mounted to the box portion.

\* \* \* \* \*